United States Patent
Korpi

(10) Patent No.: US 8,925,385 B2
(45) Date of Patent: Jan. 6, 2015

(54) LONGITUDINAL RESONATING MODE INERTIAL MASS SENSING SYSTEMS

(75) Inventor: David M. Korpi, Pacific Grove, CA (US)

(73) Assignee: Sierra Instruments, Inc., Monterey, CA (US)

( * ) Notice: Subject to any disclaimer, the term of this patent is extended or adjusted under 35 U.S.C. 154(b) by 310 days.

(21) Appl. No.: 13/312,861

(22) Filed: Dec. 6, 2011

(65) Prior Publication Data

US 2012/0144918 A1 Jun. 14, 2012

Related U.S. Application Data

(60) Provisional application No. 61/420,170, filed on Dec. 6, 2010, provisional application No. 61/521,237, filed on Aug. 8, 2011.

(51) Int. Cl.
*G01G 3/16* (2006.01)

(52) U.S. Cl.
CPC ........................................ *G01G 3/16* (2013.01)
USPC .......................................... 73/580; 73/19.03

(58) Field of Classification Search
USPC ................................. 73/580, 19.03
See application file for complete search history.

(56) References Cited

U.S. PATENT DOCUMENTS

| 5,205,153 | A  | * | 4/1993  | Hlavinka et al. ............. 73/19.03 |
|-----------|----|---|---------|---------------------------------------|
| 6,444,927 | B1 |   | 9/2002  | Korpi                                 |
| 6,784,381 | B2 |   | 8/2004  | Korpi                                 |
| 7,345,402 | B2 | * | 3/2008  | Taniguchi et al. ............ 310/320 |
| 8,563,879 | B2 | * | 10/2013 | Korpi ...................... 177/210 FP |
| 2006/0086174 | A1 |   | 4/2006  | Korpi                              |
| 2010/0258357 | A1 |   | 10/2010 | Korpi                              |
| 2013/0298675 | A1 | * | 11/2013 | Thiruvenkatanathan et al. ......................... 73/504.16 |
| 2013/0340859 | A1 | * | 12/2013 | Downie ........................ 137/486 |

OTHER PUBLICATIONS

U.S. Appl. No. 61/521,237, filed Aug. 8, 2011, David Michael Korpi.
U.S. Appl. No. 61/420,170, filed Dec. 6, 2010, , David Michael Korpi.
U.S. Appl. No. 10/904,074, filed Oct. 21, 2004, , David Michael Korpi.
U.S. Appl. No. 10/188,823, filed Jul. 5, 2002, , David Michael Korpi.

* cited by examiner

*Primary Examiner* — J M Saint Surin
(74) *Attorney, Agent, or Firm* — LaRiviere, Grubman PC

(57) ABSTRACT

The subject invention provides improved means to measure mass collected on a sample collection surface in real time. A resonant structure is used as the "scale" to determine the mass in real time. The invention employs a membrane, or collection substrate, on the end of a resonant structure resonating in the longitudinal direction. A structure resonating in the longitudinal mode offers a considerably higher resonant frequency than the same structure in the bending mode. The higher the resonant frequency, the more resolution in the frequency of oscillation is available to determine the mass of the collection surface or membrane. The present invention implements this attribute in connection with such a structure.

16 Claims, 11 Drawing Sheets

DETAIL B

DETAIL C

DETAIL D

LONGITUDINAL RESONATING MODE INERTIAL MASS SENSING SYSTEMS

CROSS REFERENCE TO RELATED APPLICATIONS

This application claims priority to the filing date of a U.S. provisional patent application having Ser. No. 61/420,170, entitled "Longitudinal Resonating Mode Inertial Mass Sensing System", filed on Dec. 6, 2010, and Ser. No. 61/521,237, entitled "Longitudinal Resonating Mode Inertial Mass Sensing Systems", filed on Aug. 8, 2011, both of which are incorporated herein by reference in their entirety.

BACKGROUND

The subject invention provides improved means to measure mass collected on a sample collection surface in real time. A longitudinal resonant structure is used as the "scale" to determine the mass in real time. The invention employs a membrane, or collection substrate, on the end of a resonant structure resonating in the longitudinal direction. A structure resonating in the longitudinal mode offers a considerably higher resonant frequency than the same structure in the bending mode. The higher the resonant frequency, the more resolution in the frequency of oscillation is available to determine the mass of the collection surface or membrane. The present invention implements this attribute in connection with such a resonant structure utilizing various novel driving and sensing methods disclosed herein. Classical real time mass measuring systems utilize resonant structures in the bending mode as disclosed in patents by Korpi in U.S. Pat. Nos. 6,444,927 and 6,784,381 as well as U.S. patent application Ser. No. 10/904,074, U.S. patent application Ser. No. 10/188,823 and US Pat. App. No. 20060086174. An important improvement of this invention is to resonate the structure in the longitudinal direction as opposed to the bending mode described in the above mentioned patents and applications.

Aspects of the invention include improvements over known devices in terms of the materials, mounting, driving, and sensing methods of the resonant structure, tube, or resonator.

The subject resonant structures are typically driven in longitudinal resonance by one of at least two different excitation methods disclosed. One such means is a voice coil with magnet; another is a piezoelectric excitation method utilizing a piezoelectric "motor" to drive the system into resonance. An improvement in the art is that neither of these methods relies on the magneto restrictive qualities of the resonant structure. The Q, or the inverse measure of energy lost per cycle of resonance, of the materials disclosed herein are among the highest of all currently available materials.

The relative sensitivity to mass detection of inertial mass sensors is a function of the fundamental resonant frequency of the resonator. The greater the resonant frequency, the greater the sensitivity. The ability to accurately measure the mass collected, or lost, where the change in mass as delta-m, at the collection means is indicated by a shift in the resonant frequency.

Mechanical resonators in oscillation will have a small jitter in instantaneous resonant frequency, defined as delta-f, where this jitter is generally a function of the mechanical resonant Q of the system where the frequency jitter, df, divided by the oscillation frequency, f, or delta-f over f (df/f) and is roughly equivalent to inverse of the value Q for the system. The higher the Q the lower the frequency jitter will be. One material with one of the lowest jitter values, and one with one of the highest Q, is an amorphous structure such as fused quartz, which is exactly why these materials are used to make the crystals used in computers. A 2.66 GHz computer, for example, uses a 2.66 GHz crystal, which refers to the crystal clock used to clock the microprocessor that allows the computer to run. Another material with a high Q as well as high strength is an amorphous structure of metal that is cooled at a rapid rate to produce a glass like structure with metal properties as well as glass like properties, in short a metal like structure with an amorphous atomic structure.

As taught herein, resonant frequency is measured by measuring the frequency at a chosen sampling rate and averaging that frequency over N measurements which permits a reduction in the RMS jitter of the frequency which results in a more accurate determination of the resonant frequency, and therefore the measured mass of the collection surface or media which is a subject of this invention.

Advantageously, the highest frequency mode of oscillation of a resonant structure is in the longitudinal mode along the long axis, which is simultaneously the stiffest axis. Unique drive structures are described to enable driving a resonant structure in this mode.

The stability and resolution of the resonant frequency of oscillation, which in practice is always some net aggregate of frequencies (because several eigenmodes of oscillation are excited by the driving impulse or mechanical impulse) is dependent upon the mechanical resonant Q of the system.

Generally, the higher the Q of the system and the more pure the drive and resulting excitation of the resonator in the target mode of resonant oscillation the more accurately the resonant frequency of oscillation, and therefore the resulting mass, can be determined. For systems with a high mechanical Q and low frequency drift or jitter, also referred to as delta-frequency, the more accurately and repeatability the actual collected mass can be determined. Key to the subject teachings are techniques to maintain very high mechanical resonant Q of the entire system and therefore the resolution of mass change or detection of the mass at the collection means or filter.

Advantages of nodal clamping and the significant improvements of the mechanical resonant Q that result are taught herein. This teaching includes stiffening the filter collection means to minimize losses from conformal or ductile dampening materials, and introduces general fabrication practices to minimize internal and external frictional dampening that tend to lower the mechanical resonant Q as described in US Pat. App. No. 20100258357.

BRIEF SUMMARY OF THE INVENTION

The preferred subject devices utilize a half wave resonant structure, where the wavelength of the first mode of resonance describes half the wavelength of the resonant structure wherein the resonant frequency of the structure is related to the collected mass on the filter assembly in near real time.

The subject half wave resonant structure is constructed using a center clamped nodal point wherein the resonant structure is clamped in the middle of the tube (or more precisely, the center of mass, which is typically the middle of a uniform structure) instead of clamped at one end. This structure is illustrated in FIGS. 1, 2, 3, 4, 5, 7, 8, and 11 illustrating where both ends are allowed to longitudinally oscillate (from conservation of energy) with a neutral nodal point at the center of mass 10 along the axis of the tube when only one half of the tube is mechanically, piezoelectrically, or magnetically driven into resonance utilizing feedback control or self resonant circuits. Node 10 on the above figures is a region of substantially no longitudinal motion and whereupon being clamped, there is minimal energy loss and minimal change of the resonant Q of the tube or resonator.

Utilizing this clamping method, the amplitude of the longitudinal motion at the clamp, or nodal point, is zero. It is possible to clamp the resonant structure at any one of the nodes described in a free-free normal mode for uniform beams. In this case one could clamp the resonant structure at any of the nodes existing at 0.132, 0.224, 0.5, 0.776, and 0.868 units of length (where 0.5 refers to clamping in the middle as described herein) for the first three modes of resonance.

BRIEF DESCRIPTIONS OF THE DRAWINGS

Figure 1:
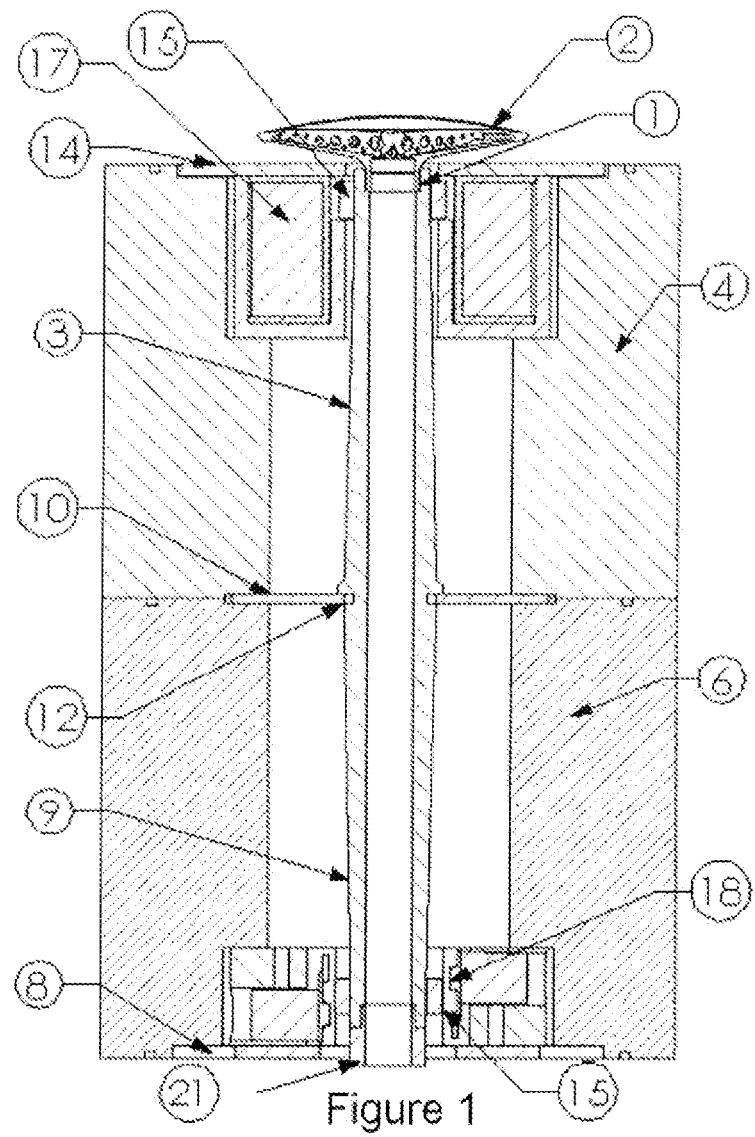
FIG. 1 shows a cross sectional side view of the invention where the resonant structure is driven by a fully captured magnet-coil system at the top and is sensed using a Hall sensor or sensors, or any other sensing means as described in FIG. 6 and FIG. 9, at the bottom to close the measurement and control loop.
Figure 3:
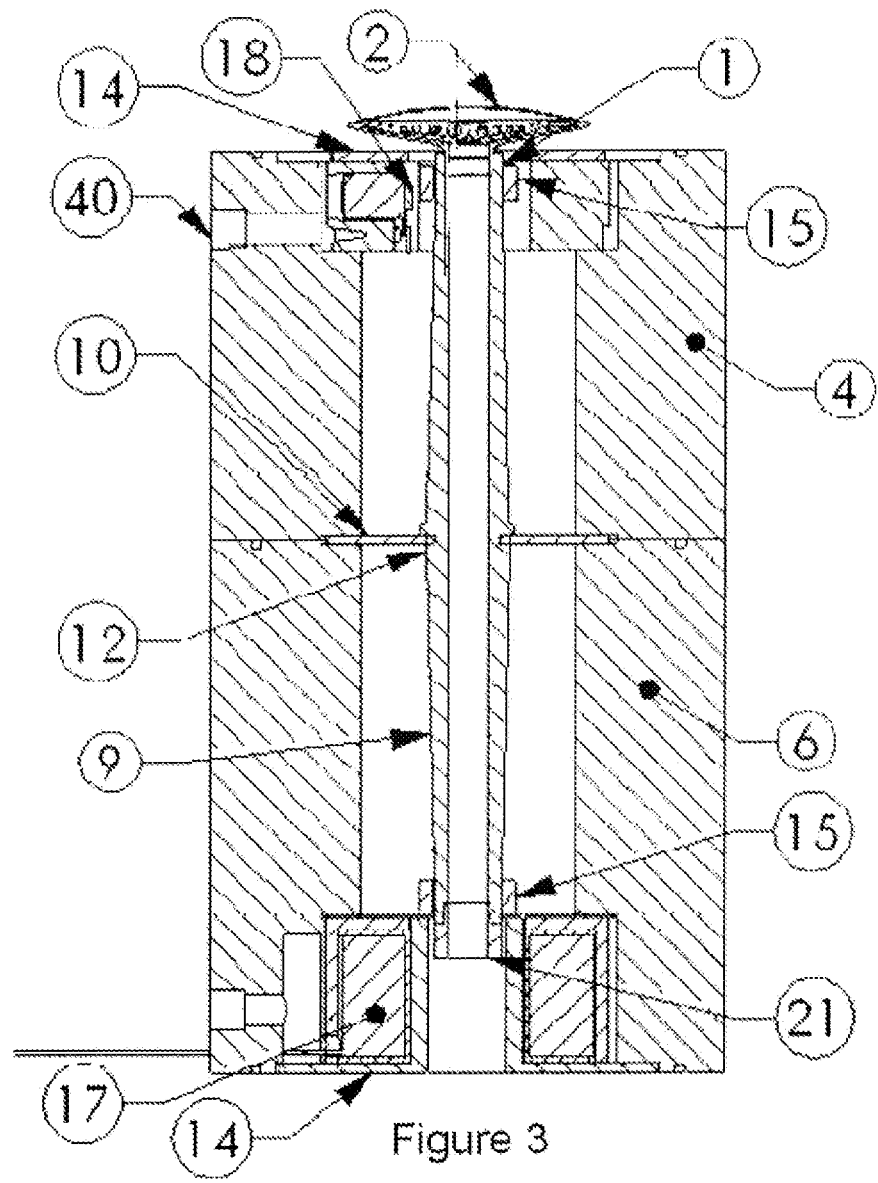
FIG. 3 shows the drive coil and ferromagnetic core in close proximity to the face of the magnet at the bottom with the sensing means at the top near the collection means.
Figure 4:
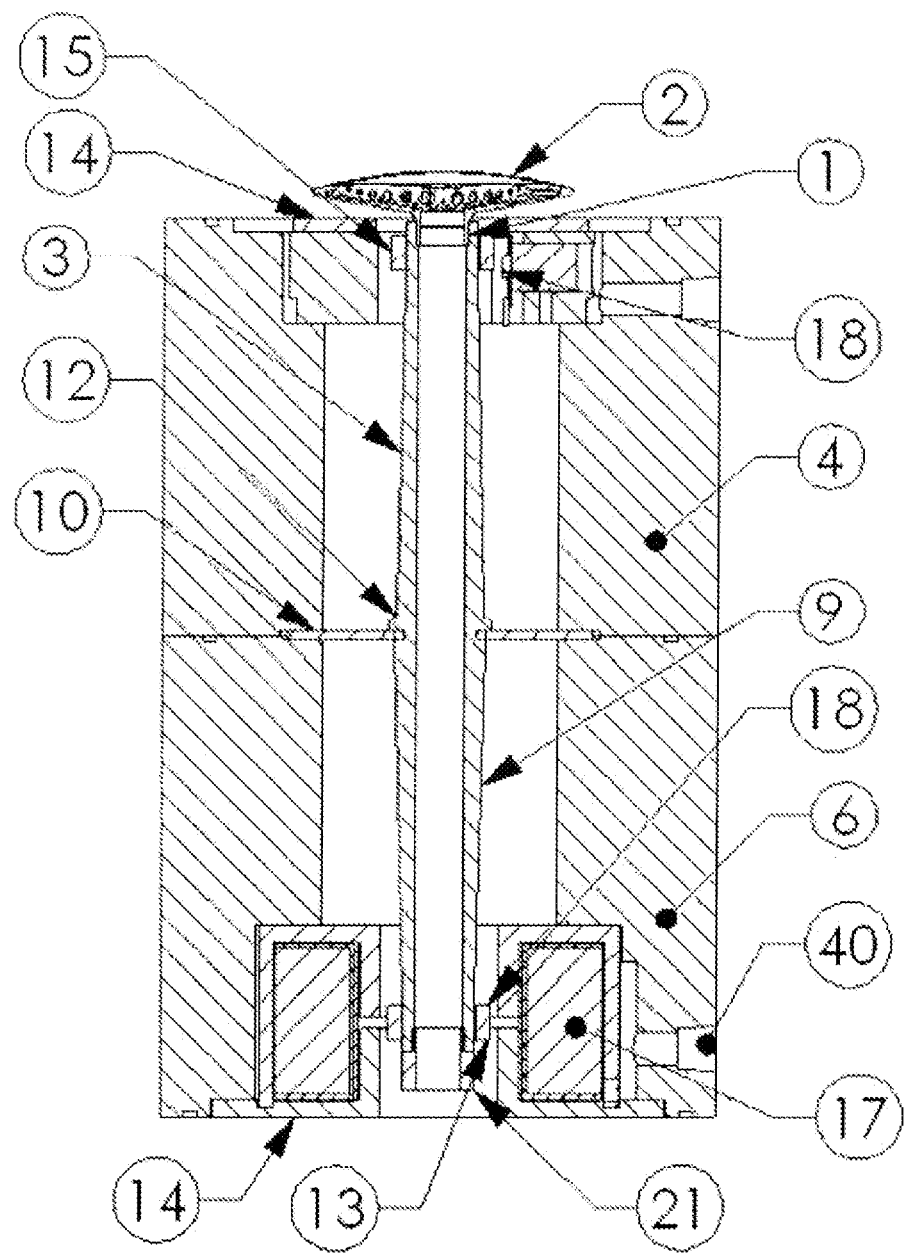
FIG. 4 shows the detail of the subject half-wave resonant structure with a non-captured drive system at the bottom with the sensing means on top.
Figure 5:
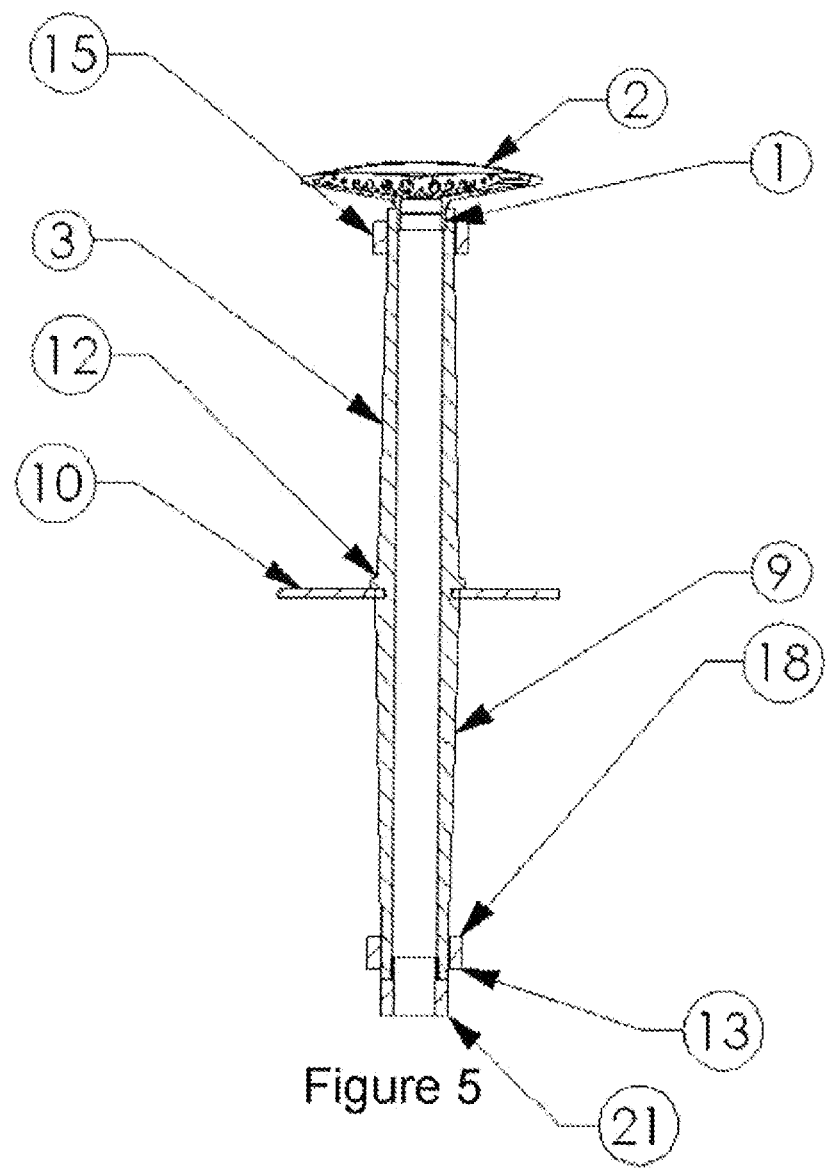
Figure 6:
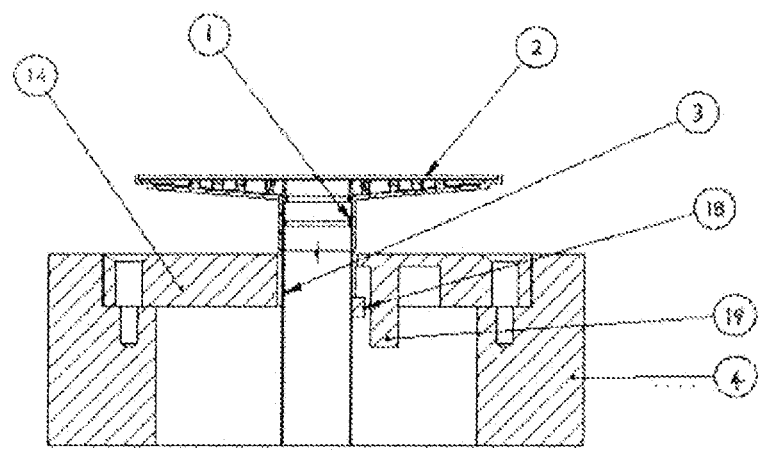

FIG. 5 shows the detail of the subject half-wave resonant structure resonator assembly used in FIGS. 1, 3, and 4 showing the details of the counterbalance 21 and magnet 15 as well as other elements FIG. 6 shows an alternate method of sensing the resonance of the resonator using magnet or grating with the associated Hall sensor or optical sensor as well as the flat style of the collection means.

Figure 7:
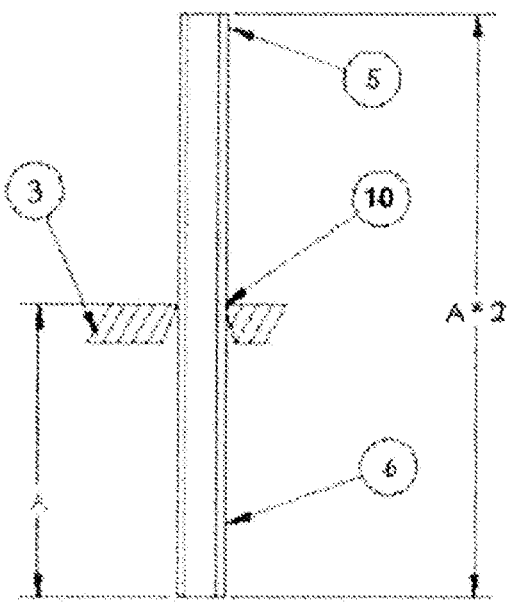

FIG. 7 shows a diagram of a cylinder clamped in the subject half-wave resonant structure mode that, like a tuning fork, would not lose energy to the center clamping node 10.

Figure 2:
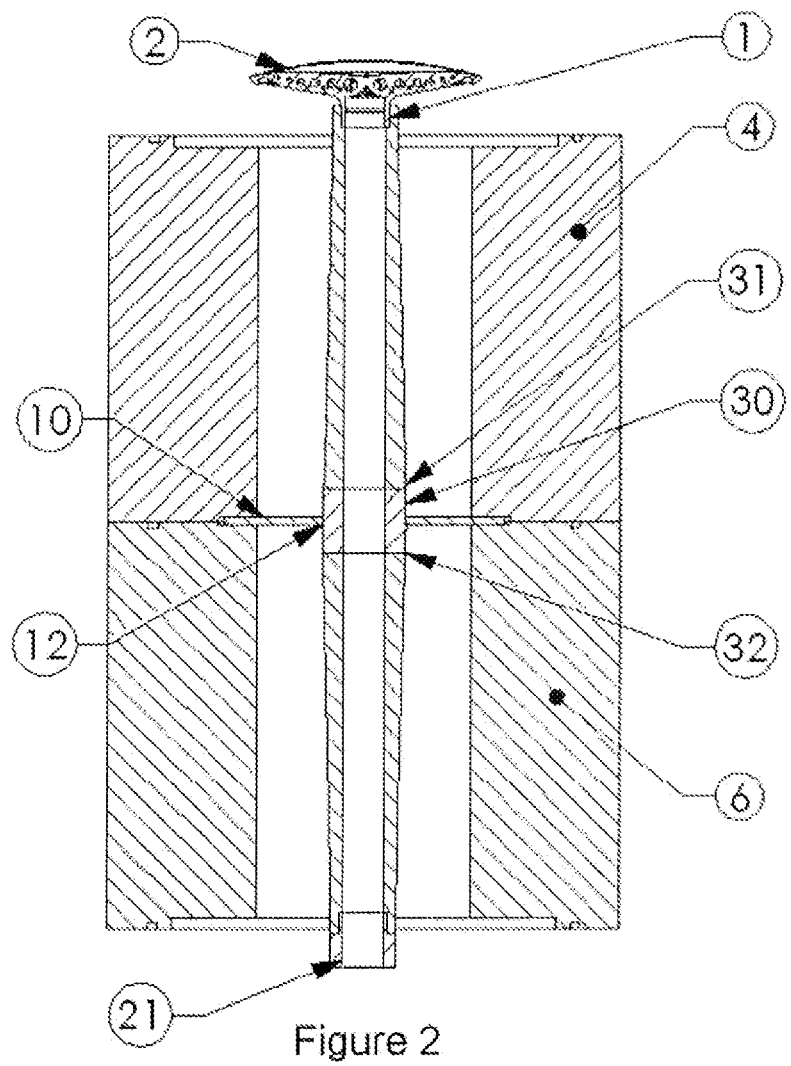
FIG. 2 shows a "Piezo motor" driving and measurement system that is used where the piezoelectric properties of a preferred embodiment utilizing a 5-degree X Cut quartz crystal structure is used to minimize temperature sensitivity to frequency change.
Figure 8:
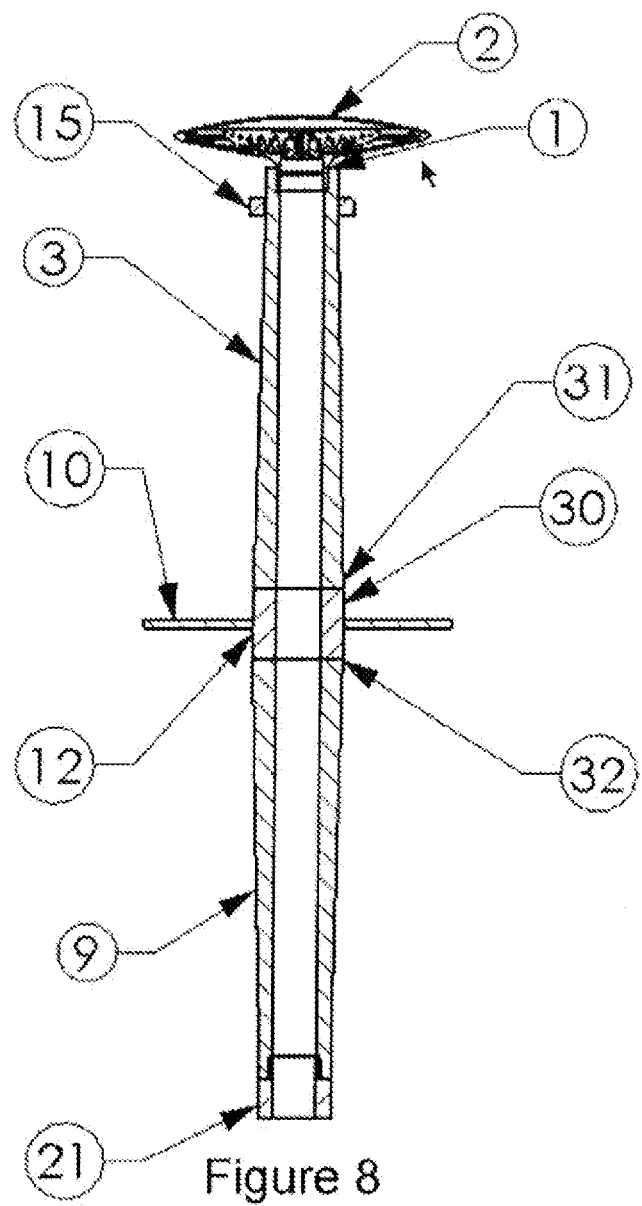

FIG. 8 shows a cross sectional side view of the resonant structure assembly detailing the resonant structure affixed between a Piezo ceramic quartz crystal motor within FIG. 2.

Figure 9:
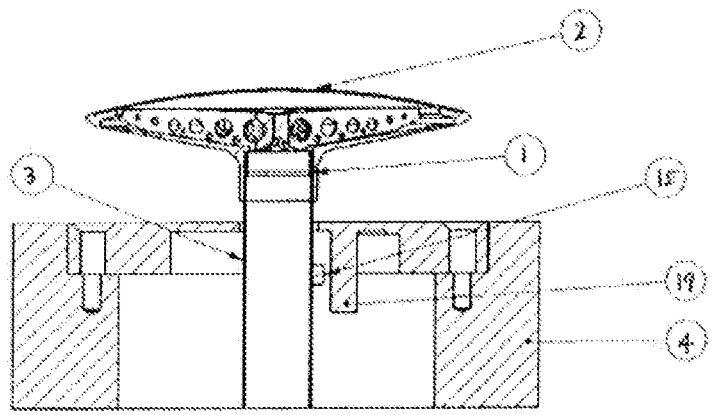

FIG. 9 shows a cross sectional side view of the invention with detail showing different methods of sensing the movement of the resonant structure as well as the curved style of the collection means.

Figure 10:
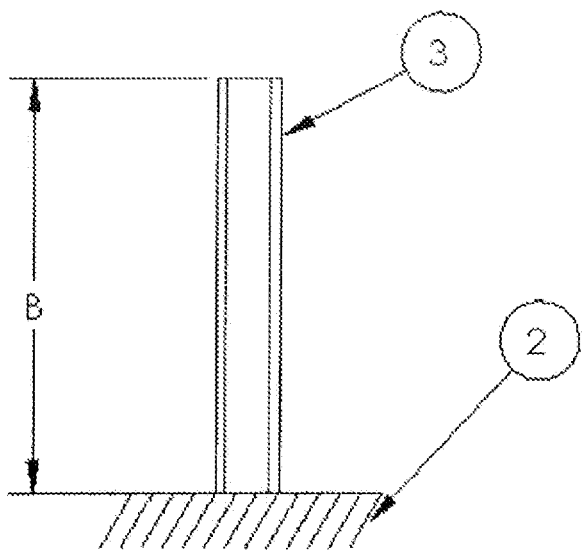
Figure 12:
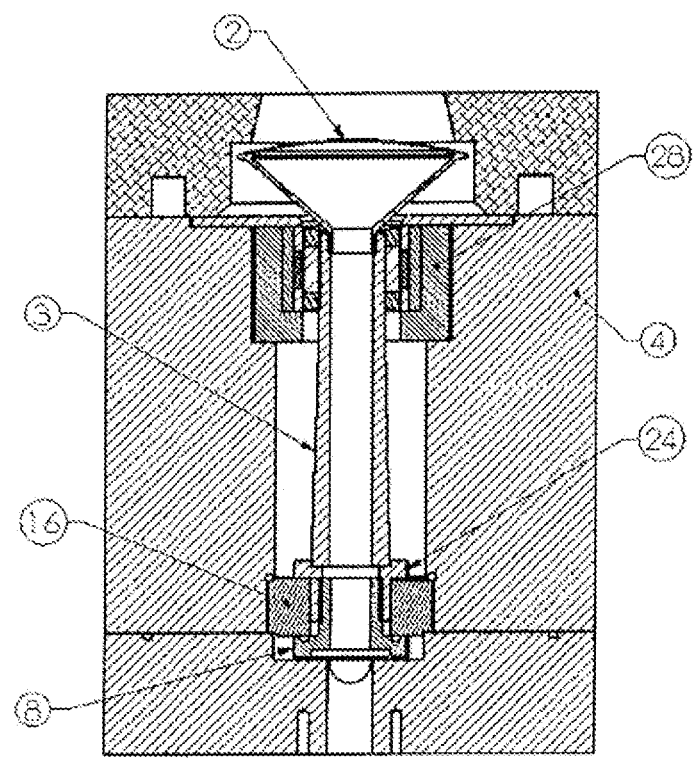

FIG. 10 shows a cross sectional side view of the invention giving the basic operating principle of the single end clamped system that is to represent the operating principle of the system of FIG. 12.

Figure 11:
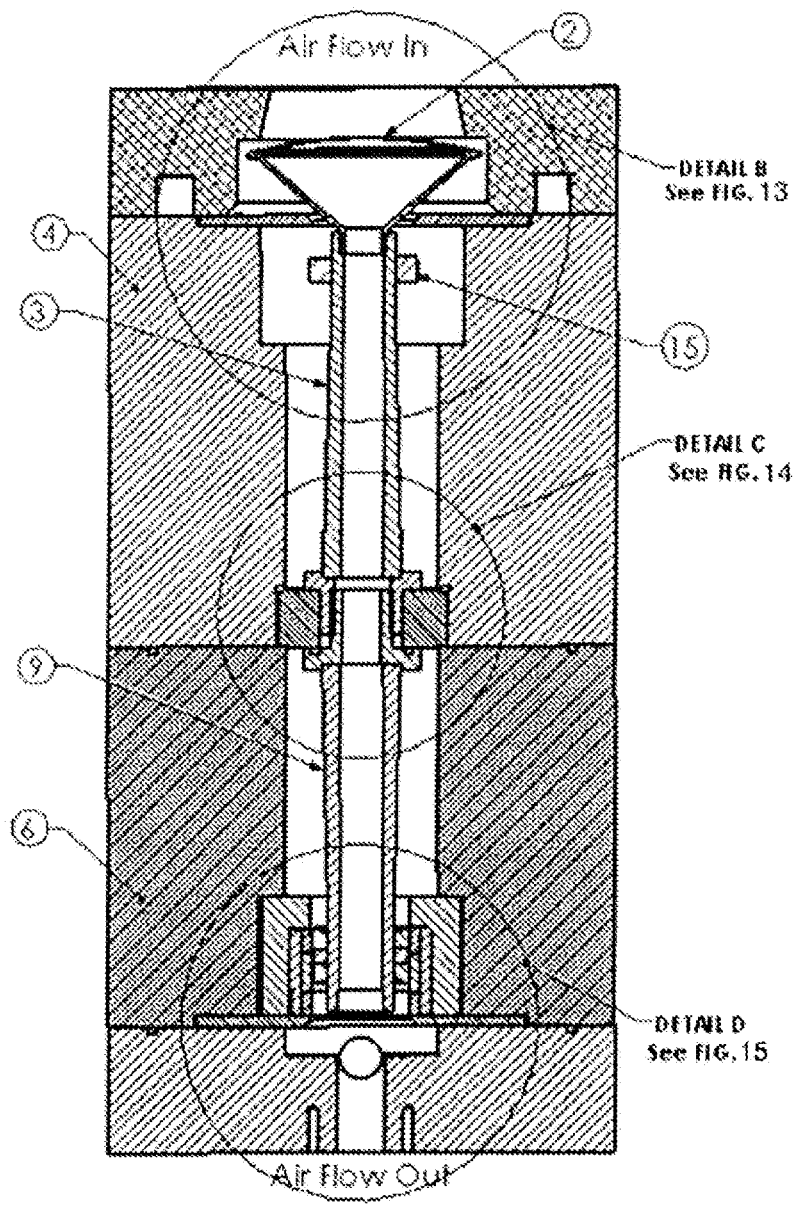

FIG. 11 shows a cross sectional side view of the preferred embodiment of the invention using a load cell at the center node of a half-wave resonant structure and a novel and useful magnet-coil drive system.

FIG. 12 shows a cross sectional side view of an alternate preferred embodiment of the invention using a load cell at the end node of a quarter-wave resonant structure and a novel magnet-coil drive system.

Figure 13:
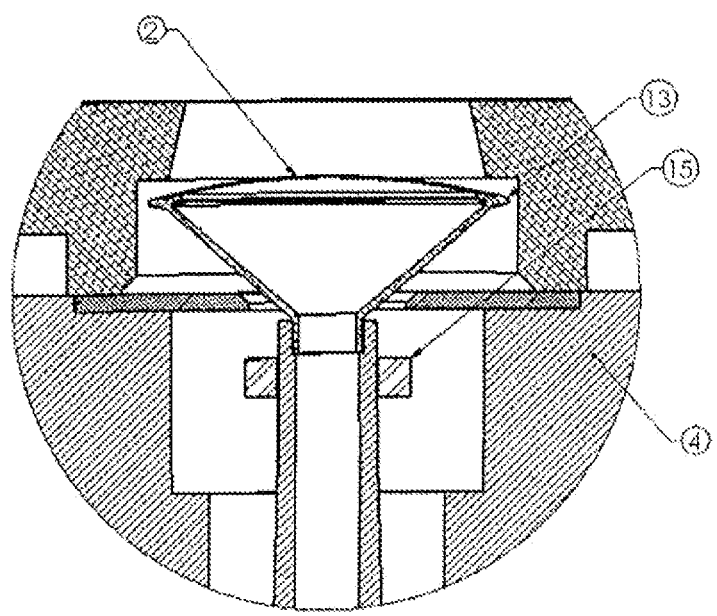

FIG. 13 shows a cross sectional side view of the invention showing the collection filter and balance mass that provides for equalizing the masses at either end of the resonant structure so that it operates in a mode that allows the center clamp to be physically located at the node point of the system.

Figure 14:
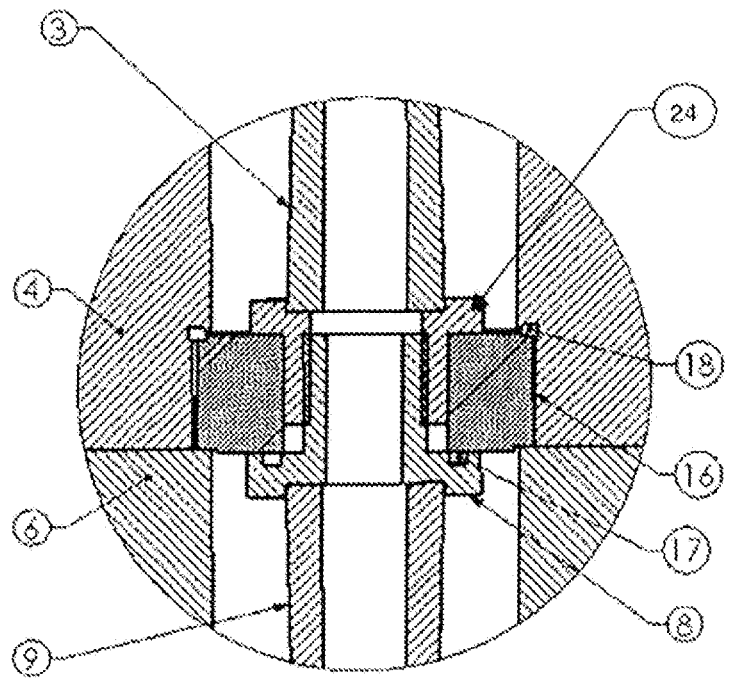

FIG. 14 shows a cross sectional side view of the load cell and clamping system of the preferred embodiment of the invention detailing the load cell clamping system and resonators secured to the load cell through a pre-load system.

Figure 15:
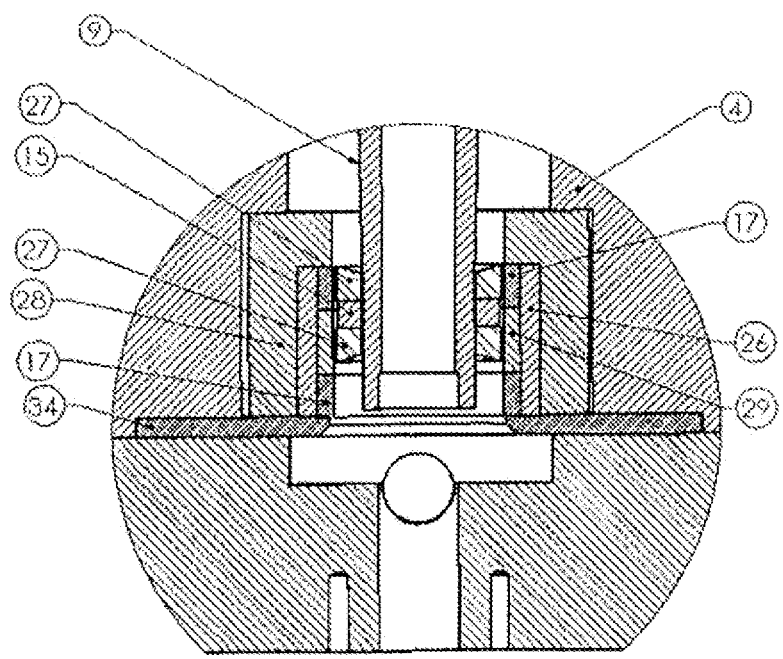

FIG. 15 shows a cross sectional side view of the invention detailing the novel magnet-coil drive system.

DETAILED DESCRIPTION OF THE DRAWINGS

FIG. 1 is a section view of the basic construction of one embodiment of the subject patent. In all of the Figures we are able to see a removable filter assembly 2 is shown mounted to the upper side of the resonator 3 at 1. The flange 10, for the node clamp, at 12, shown clamping the resonator tube securely between the upper base 4 and lower base 6. Again, nodes are described as the location of zero amplitude of a resonant structure.

In FIGS. 1, 3, 4, 11, and 12 the drive coil is located at 17 within an optional iron, Permalloy, or ferromagnetic core 14 mounted in the base structure 6 on FIGS. 3 and 4 and mounted in the top structure 4 in FIG. 1. The location of the sense and drive coils can be easily reversed with no adverse effects if care is used in providing adequate isolation and elimination of spurious electromagnetic fields.

Various drive schemes to cause resonance are disclosed. The first three use a coil and magnet assembly where the field generated in the coil repeals and attracts the magnet and a circuit is driven to cause the system to be in resonance. The first three utilize various sensing methods to close the loop to attain resonance and measure the resonant frequency in order to infer the mass of the collection means. The method of closing the loop in a resonant system to cause resonance is well known in the art and not necessary to disclose herein.

FIG. 1 shows the drive coil 17 and ferromagnetic core 14 fully capturing the magnet 15. This arrangement yields a very efficient drive arrangement because the system is in a push pull drive field where the magnetic lines of flux are concentrated through the magnet 15.

Additionally, the use of elastomeric elements in any part of the support structure would serve to reduce system Q. Accordingly, rigid materials (such as metal O rings and weldments) for construction are more preferred, even for seals.

Center clamping, also defined as center-of-mass clamping, does not restrict the location of the clamp. The center clamp is typically nearly equal to the thickness of the resonant structure or thinner. The use of a center clamp, with two opposing free motion anti-nodes at the distal ends, allows the drive means or coil to be located along the length at one distal end of the clamped node and the sensing means, optical, magnetic, or sensing coils to be located at the opposite distal end of the clamped node.

The drive could also be a Piezo electric device "Piezo motor", shown as item 30 in FIG. 2, at the nodal point driving and supporting the two distal ends. The location of the sense and drive coils can be easily reversed with no adverse effects. Nodes are described as the location of zero amplitude of a resonant structure and are considered mounting locations that dissipate the minimal amount of energy and have the least effect on the mechanical resonant Q of the system. Anti-nodes of this resonant structure are at the distal ends of the tubes where a collection means or filter structure or test mass is mounted and where the maximum amount of longitudinal motion is located.

Typically, velocity sensitive transducers, such as hall sensors, optical sensors, moving magnets or moving coils, provide optimal signals for closing the loop to measure the resonant frequency when they are located at the anti-nodes;

likewise, any Collection means or filter structure or test mass to be measured when mounted at the anti-nodes provide the largest excursion in resonant frequency for a given change in mass.

Of course, the subject devices are not restricted to collecting any particular type of mass on filters. It could very well be the mass of diesel particulate collected on a filter as well as the number of insects landing on a surface to even how much material was deposited in a CVD process.

In FIG. 2 a "Piezo motor" is used where the piezoelectric properties of a quartz structure cut in the axis that results in the lowest thermo elastic modulus of elasticity to maintain a near zero temperature coefficient of frequency. One preferred configuration is a 5-degree X Cut crystal to attain the desired characteristics. In this scheme one can drive and measure the resonance by picking off the signals as well as injecting the control signals at 31 and 32.

FIG. 3 shows the drive coil 17 and ferromagnetic core 14 in close proximity to the face of the magnet 15. This arrangement has the magnetic gap shown in one of the many locations available. This is not the most efficient drive arrangement because the magnetic lines of flux are not concentrated through the magnet 15 but is easy to assemble because the magnet is not captured as it is in FIG. 1. In this configuration the system can be driven into resonance to determine the mass of the collected particulate or material.

It is generally desirable to select a material with the highest Q for the inertial microbalance. Referring to FIG. 3 a section view of the basic construction of another embodiment of the subject invention is with a removable filter 2 mounted to the upper side of resonator 3 at 1.

In FIG. 3 and FIG. 4 the clamping washer 10 for the node clamp at 12 is shown clamping the resonator tube securely between the upper base 4, clamping washer 10, and lower base 6. Nodes are described as the location of zero amplitude of a resonant structure. The drive coil 17 is located in close proximity to the magnet 15, which is securely mounted to the resonator at 9. It should be noted the design of the coil magnet drive system may be designed similar to a voice coil in a speaker or a flat arrangement similar to a flat solenoid coil design common in the art. Note that 14 that acts as an iron or ferromagnetic field focusing means (flux concentrator) mounted in the lower base structure 6. The sense means is located at 15 allowing detection of the resonance of the upper resonator 3. Alternatively, it is possible to incorporate an ultrasonic velocity transformer in the tube end to maximize longitudinal amplitude at the distal anti-node end 3. The sensing means can also be optical as detailed previously in FIG. 3.

In FIG. 4 the drive coil 17 and ferromagnetic core 14 are in close proximity to edge of the magnet 15 at or near the preferred dimension of ⅓ the thickness of the magnet. This arrangement has the magnetic gap shown at or near the geometric center with a uniform gap width all around. The gap width can be different in the radial dimension compared to the axial dimension. This, again, is not the most efficient drive arrangement because the magnetic lines of flux are not concentrated through the magnet 15 but is easy to assemble because the magnet is not captured as it is in FIG. 1.

Referring to FIG. 5 the resonant structure assembly of the resonator with the collection means or filter structure or test mass or filter 2 is shown secured to the upper side of the resonator 3 at 1 and the node clamp at 12 leaving the lower end of the resonator at 9 with the counterbalance mass 21 that is selected to be at or near the same weight as the filter assembly 2 so that the system is balanced at the node clamp 10. It is important to realize that when the invention refers to the resonators at 3 and 9 that the readers do not consider they are separate structures. They are intimately connected. Driving structure 3, by conservation of momentum, dictates that structure 9 respond in an equal and opposite fashion. The drive coil, or drive means, located at 3 or 9 can have the sense coil, or sensing means, located at 9 or 3 and can put both on the same side in yet another configuration. When utilizing a sensing means that is sensitive to spurious magnetic fields a means to prevent or minimize electromagnetic interference may be utilized to result in the highest mechanical resonant Q of the system.

Referring to FIG. 8 the similarities to FIG. 5 can be seen but note the magnets of FIG. 5 are missing from FIG. 8. This is because FIG. 8 depicts the use of a "quartz motor" 30 drive where the measurement and control leads to 31 and 32 are provided.

In FIG. 6 the sense coil may be replaced with other sensing means such as optical or Hall type sensors as illustrated in FIG. 6 where a small magnet or optical target 18 is shown in close proximity to a Hall sensor or optical sensor 19.

Referring in more detail to FIG. 6 an alternate method of sensing the resonance of the resonator 3 using magnet or grating at 18 with the associated hall sensor or optical sensor at 19 is shown. Other sensing means based on principles of astigmatic focal spot sensing, speckle metrology pattern, emission Doppler frequency shift, or interferometric (an Interferometer is an optical measuring tape if you will) can provide feedback signal using a compact, low-power laser diode or LED. These optical techniques take advantage of the quality of the single frequency laser diodes short wavelength or small focal spot to provide a large signal for a slight dimensional change in movement or length at a bandwidth much greater than the longitudinal oscillation frequency mode of the inventions subject resonant structures that are therefore unaffected by changing magnetic fields emanating from the drive coil. Velocity detectors using a small magnet or magnetized section of the tube and a stationary voice coil can alternatively be employed to determine the resonant motion of the resonator. This mode of sensing will utilize first derivative signal because the velocity of the resonant structure within the coil is the first derivative of position. It is important to realize moving coil detectors do not determine position, they determine velocity. The advantage is that the first derivative of a sinusoidal function is an identical sinusoidal function shifted 90 degrees out of phase and thus coherent phase locking techniques will work for tracking frequency. This is handy because it is frequency that indicates the mass, not the absolute phase. All of these detection signals can be utilized in a simple phase locked loop or negative loop feedback system to change the drive frequency towards the mechanical resonance of the system. Unlike classical ultrasonic driver applications, detailed in much of the prior art, the optimal design of the inventions entire system is towards a high mechanical and electrical resonant Q to provide the greatest frequency stability of the drive and electrical sense signal for a given collected mass. This is because most of the prior art describing ultrasonic resonator applications do not require that they be able to lock on to a particular frequency with low jitter because they have lots of power and simply want to weld plastic, clean teeth, or atomize liquids. As such almost none of the prior art needs to deal with the issues detailed herein.

One may replace the drive coil assembly 17 of FIG. 1 or FIG. 3 or FIG. 4 with a voice coil assembly similar to high end speaker assemblies to drive the system into resonance. Just as well, another approach provides a flat face type coil drive assembly that has a high flux area for the gap to increase efficiency.

Alternatively, when the structure similar to FIG. 1 is driven by a coil 17 magnetism theory dictates that the drive coil acts as a variable reluctance core that depends on the phase of the strain waves passing through it. The slight changes in coercivity induced by the strain waves being off and on resonance will cause a slight back EMI to be generated in the coil 17. This back EMF can be detected as impedance and be used simultaneously as a sense coil and drive coil in a self-excited resonant circuit that minimizes drive coil impedance which thereby causes the electrical drive frequency to match the mechanical resonant frequency of the resonator. This back EMF is an oscillating electrical function that has a phase relationship to the drive current waveform. As the drive current waveform approaches the mechanical resonant frequency, from a lower frequency, the back EMF waveform phase with respect to the drive waveform will lag. The back EMF waveform will be equal to zero at the exact mechanical resonant frequency and the back EMF waveform will lead when the drive waveform frequency is greater than the mechanical resonant frequency. This phase detection can be locked by using a PLL (phase locked loop) to servo the drive frequency to maintain a zero phase lag between the back EMF waveform and the drive current waveform. This point of operation, with zero phase lag, is one of the most efficient, with the lowest drive impedance in the coil and the highest mechanical (and electrical) resonant Q in the circuit.

Using the "Piezo motor", as shown in FIG. 2 and the resonator detailed in FIG. 8, as the "drive coil", will allow another inventive aspect to measure the phase of the voltage instead the phase of the impedance in a very similar manner to accomplish the same task as just described. Advances in DSP design and performance as well as significant decreases in cost a digital solution to accomplish precise control may be invoked. FIG. 7 is a schematic representation of the subject half-wave resonant structure. Note the "knife edge" at 10 that creates a center node clamp to the resonant structure, the upper part at 5 (which, for illustration purposes, will be called the mass collection end) and the lower part at 6. The resonant structure has a total length of A*2 (twice the length of A, could also be the center of mass whereby the dimensions would not be as shown) and is clamped A units below the base 3, or is node clamped at 0.5 units of length as shown previously above. It is important to note that center clamping is most commonly accomplished at the center of mass but can be at any of the nodes mentioned above.

The "knife edge" at 10 in FIG. 7 could be an elastic member, such as an O-Ring as well as a washer welded or shrink fit to the resonant structure at 10. Of course an O-Ring is elastomeric and could damp the system, which is not desirable. Even though the node point dissipates zero energy we teach that using anything but a rigid support only tends to decrease system Q. The preferred embodiment utilizes rigid materials at the node clamping point with an alternate embodiment utilizing elastomeric materials.

FIG. 8 shows a cross sectional side view of the invention detailing the resonant structure assembly affixed between a Piezo ceramic quartz crystal motor.

FIG. 9 shows a cross sectional side view of the invention with detail showing different methods of sensing the movement of the resonant structure assembly shown in FIG. 2.

FIG. 10 shows a cross sectional side view of the invention giving the basic operating principle of the clamped system where the base 2 is solid and the resonant structure of length B is driven so that the free end 3 resonates up and down in the longitudinal direction.

Another variant is described as an appropriately shaped (glass blown or fused quartz structure) with an electrodeposited layer of magnetostrictive material deposited on the outside of the structure, such as depositing the layer over the resonant structure shown in FIG. 5. This electrodeposited layer of magnetostrictive material will have a very low energy of coupling, but sufficiently high mechanical resonant Q resulting in a design such that the loss in drive energy is more than offset by the decrease in frictional losses from this electrodeposited layer of magnetostrictive material. The high mechanical resonant Q is a result of the intimate contact of the thin deposited metal magnetostrictive film upon a thin walled quartz resonator. The collection media or filter holder may also be fabricated integrally from a bonded quartz geometry and support stipple structure (similar to vacuum chucks in the semiconductor industry) as well as diamond frit material to maintain a very high mechanical resonant Q.

Another preferred implementation involves driving the resonant structure longitudinally utilizing a voice coil and magnet drive means. The primary advantage of this approach is that the resonant structure does not have to be fabricated out of the typical low Q magneto restrictive materials. This embodiment will allow selecting materials with high Q factors, where the Q relates to the inverse of energy loss per cycle of resonance. Some alloys of nickel based alloys; Bulk Solidified Amorphous Alloys, Liquid metal, Ni Span C, Ni Span D, titanium, glass, sapphire, ruby, crystalline quartz, fused quartz, and quartz alloys are known to exhibit extremely high Q factors and are a good choice for this inventive idea.

Various advantages that may be realized in accordance with the subject methods and devices variously include, but are not limited to:

The energy transmitted to the support by the resonant structure is minimized thereby increasing the "Virtual Q" where the "Q" can be considered as a measure of inverse of the energy loss per cycle of resonance. Designing the resonant structure to utilize a center clamped mode allows for magnetic separation of the drive coil from the sense coil, thereby minimizing magnetic cross talk that reduces the "Virtual Q" of the system. The "Virtual Q" is reduced by reducing the magnetic cross talk that comes about when the energy to drive the coil is picked up by the sense coil. In one embodiment the invention teaches that utilizing an alternating current drive to cause a pure sinusoidally changing magnetic field in order to excite only the first fundamental frequency without including the harmonics is paramount in obtaining the highest system Q. There are digital methods, using DSP (Digital Signal Processors) to drive a coil, with appropriate electrical modifications such as adding resistors, capacitors, and/or inductors, to obtain a pure sinusoidally changing magnetic field in the Piezo motor, the magnetostrictive tube or voice coil drive that may not require inputting a pure sinusoidally changing drive current typical of analog circuitry.

Utilizing a center clamped mode provides a convenient geometry to introduce a variety of sensing methods other than utilizing a hall sensor or a sense coil. A hall sensor can be added to replace the sense coil. An optical grating, or any similar surface, can be affixed to the resonant structure and corresponding optical measuring methods may be utilized to affect the sensing portion of the system. The benefits of utilizing an optical sensing method with a coil drive system is that the spurious magnetic energy generally does not interfere with most optical sensing methods and the measurement will not decrease the Q of the system because no energy is induced into typical optical sensing systems.

Further improvements relate to methods of manufacture of the collection media. Optimally, the ideal collection means or filter, shown in FIG. 1 as item 2, would be constructed of deposited amorphous diamond on a film deposition form that is subsequently dissolved away leaving a very high stiffness 100 to 200 micron thick support structure with resonances above the range of 10,000 to 100,000 of Hz. This technology improvement is most similar to improvements in high quality tweeter domes used in high-end audio equipment that are designed to have a high resonant frequency of the internal structure. Utilizing this design philosophy will have a very low impact in the overall mechanical resonant Q of the entire system so that the fundamental mode of oscillation does not excite high order modes of oscillation of the collection means or filter and therefore the entire system.

The use of non-organic materials in the assembly minimizes the frictional dampening characteristics associated with many plastic and cross-linked polymer derived materials one might use for the filter collection means, or filter holder. A benefit of a diamond structure is it can be manufactured to exacting specifications where it can behave much like a Teflon filter media having a collection efficiency of 99.99% at 0.1 microns and can be run as a heating element as well to burn off the particulate much like a self cleaning oven. In this configuration a re-usable filter collection means is made where the heating capabilities of the deposited amorphous diamond structure is utilized to burn off the particulate or the collected sample. Additionally, ozone can be utilized to clean the remaining particulates that are not removed by heating alone, that are composed of carbon or hydrocarbon particulates, that are susceptible to free oxygen radical that will convert to carbon dioxide, carbon monoxide, and water in the presence of ozone.

Still more subject improvements relate to methods of removing particulate from the collection media. The method is to provide a corona discharge system or ultraviolet light ozone generation system and automatically or manually draw the ozone through the collection means, or filter or media to rid the media of contamination of the light carbon and hydrocarbon particulate contamination. The injection of ozone flow can be from any direction. Upon exposure to ozone, light carbon is converted directly to carbon dioxide, carbon monoxide, and water vapor thereby allowing the media to be utilized again without having to manually change the media. Utilizing such an approach offers the ability to determine the percentage of mass that is pure carbon. This may be particularly advantageous in us in two exemplary applications: in diesel compliance testing as well as inhalation toxicology studies.

The subject method is to collect the carbon bearing particulate, just as one would in a normal collection event, and record the mass of the resultant collection event. Then, one would flood the system with ozone and thereby convert the particulates composed of carbon or hydrocarbon particulates susceptible to free oxygen radical that will convert to carbon dioxide, carbon monoxide, and water and then read the mass at the end of the cleaning cycle. The remaining mass could be conjectured to be elements non-carbon material such as asbestos from a nearby burning building.

ALTERNATE EMBODIMENT

Referring to FIG. 11, FIG. 13, FIG. 14, and FIG. 15 show section view(s) of the basic construction of a preferred embodiment of the subject invention with a removable filter assembly 2 mounted to the upper side of the resonator 3 are shown in FIG. 11. The operating principle comprises a system with two balanced resonators (wherein being "balanced" means that the mass of the filter assembly 2 plus the balance mass 23 is equal to the mass of the elements that are secured to the lower resonator 9). Specifically, these elements that are secured to the lower resonator 9 are shown in FIG. 15 as the magnet 15 and the two equal backing irons 27. The system is excited into resonance with the drive assembly contained in housing 28. Impulse force is monitored, as shown in FIG. 14, with the load cell 16 that will produce a sine wave that results when the system is driven into resonance that can be utilized in a feedback loop to allow one to drive the system into and at resonance. The filter assembly 2 of FIG. 11 could just as well be located on the drive end at Detail D of FIG. 15 as is indicated in FIG. 12 where the filter assembly 2 is located at the same location as the drive means. This preferred arrangement will have the driving means located in the same physical location as the filter collection assembly.

Referring now to FIG. 11 a preferred embodiment is disclosed that utilizes a load cell 16 to sense the force imparted to the node point. FIG. 14 shows the center clamps 8 and 24 are shown holding the top resonator 3 and the bottom resonator 9 and as a structure is seen not to be nearly equal to the thickness of the resonant structure, for this inventive idea. The load cell 16 with the center clamps 8 and 24 can be considered as a "unit rigid structure" that has a center of mass about the clamping structure 4 and 6 that creates a "virtual" node that is determined experimentally by adding or subtracting balance masses 15 as shown in FIG. 11 and FIG. 13. The balancing process can be accomplished by adding or subtracting mass at 15 of FIG. 11 until the resonance is equal and opposite at both resonator 3 and resonator 9 in FIG. 11. The use of a center clamp, with two opposing free motion anti-nodes at the distal ends, allows the drive coil 17 to be located at one distal end of the clamped node 9 and an equivalent total mass, as shown in FIG. 11, by virtue of the mass of the filter assembly 2, and the balance mass 15 that is located at the opposite distal end of the clamped node 9. The location of the filter assembly 2 and balance mass 15, can be reversed with no adverse effects. The steep angle of the filter holder 2 is shown in FIG. 13 provides for a rigid structure that will minimize any tendency of the filter holder 13 to resonate out of synch with the resonator 9 or 3 shown in FIG. 11. Anti-nodes of this resonant structure are at the distal ends of the tubes where a collection means or filter structure or test mass is mounted at 3 and where the requisite amount of longitudinal force is present in order to be sensed with a load cell type sensor. As such, the design replaces the classical motion sensing systems at the distal end with a force sensing system at or near the node point created by the assembly shown in FIG. 14.

In FIG. 11 the drive coil depicted as Detail D, FIG. 15, may be located within the top base 4 or as shown in the bottom base 6. Alternatively, replacing the load cell 16 with a piezoelectric drive motor 30 from FIG. 8, can achieve such advantages as described above.

FIG. 12 shows the structure of the resonator with the collection means or filter structure or test mass or filter 2 secured to the upper side of the resonator 3 and the node clamp 16 without the lower resonator 9 of FIG. 11. This embodiment, while simpler to manufacture, is not preferred but is a viable alternative for various applications. The system works in a manner similar to that depicted in FIG. 11 except that the energy is not conserved with an equal and opposite reaction as is gained with a geometrically balanced system as shown in FIG. 11.

FIG. 13 shows a cross sectional side view of the invention showing the collection filter 13 and balance mass 15 that provides for equalizing the masses at either end of the resonant structure so that it operates in a mode that allows the center clamp to be physically located at the node point 10.

In FIG. 14, load cell 16 is clamped between the top base 4 and the bottom base 6 where the two resonators 3 and 9 are secured to the top pre-load clamp 24 and the bottom pre-load clamp 8 thus connecting the resonator tube securely between the upper base 4 and lower base 6. This preferred embodiment illustrates the means to sense the resonant frequency by sensing the impulse force as opposed to measuring a physical movement at the distal end. In this load cell configuration the system has the ability to sense the equivalent of micron movements at the distal end by virtue of measuring the impulse force that causes those small movements.

The drive coil assembly is shown in FIG. 15 (Detail D) as the components that are shown mounted in the base structure 4 with circumferential adjustment allowed by the drive assembly clamp 34. Axially poled, DC Bias Magnets or Magnets 15 are secured to the resonator 9, with backing iron 27 or ferromagnetic cores at 27 shown above and below the magnet at 15. Concentric with these, and with a small air gap are two drive coils 17 wound in opposite directions with an insulator 29 between them. These two coils 17 can be optimally as shown, and utilize a backing iron 27 to increase the magnetic efficiency of the electromagnetic drive system. This arrangement allows for an efficient drive system wherein the required impulse to the load cell can be attained to close the loop on the desired resonant frequency with a minimal amount of current required. As shown in FIG. 11, the drive assembly housing 28 could alternatively be located within the top base 4 just as well as it is shown in the bottom base 6 if the masses of the two resonators 3 and 9 are balanced with a properly selected balance mass 23 placed on the lower resonator 9.

Utilizing a load cell to monitor the transmitted force resulting from a resonant structure has advantages to classical methods of monitoring the resonant frequency of a system in longitudinal excitation by way of not requiring large forces to physically impart movement to the resonant structure. The advantage of the drive system is that a small drive, sufficient to induce resonance, can be utilized to drive an "impulse" that can be easily detected with a load cell.

Utilizing a dual coil magnetic drive system increases the efficiency of the drive system. The drive with oppositely wound coils and the arrangement shown in FIG. 15 is extremely efficient and is a novel method to drive resonant structures.

VARIATIONS

It is contemplated that any optional feature of the inventive variations described may be set forth and claimed independently, or in combination with any one or more of the features described herein. Reference to a singular item, includes the possibility that there is a plurality of the same items present. More specifically, as used herein and in the appended claims, the singular forms "a," "an," "said," and "the" include plural referents unless specifically stated otherwise. In other words, use of the articles allow for "at least one" of the subject item in the description above. It is further noted that claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims shall allow for the inclusion of any additional element irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language. Use of the term "invention" herein is not intended to limit the scope of claims in any manner. Rather it should be recognized that the "invention" includes the many variations explicitly or implicitly described herein, including those variations that would be obvious to one of ordinary skill in the art upon reading the present specification. Further, it is not intended that any section of this specification (e.g., the Summary, Detailed Description, Abstract, Field of the Invention, etc.) be accorded special significance in describing the invention relative to another or claims. All references cited are incorporated by reference in their entirety. Although the foregoing invention has been described in detail for purposes of clarity of understanding, it is contemplated that certain modifications may be practiced within the scope of the claims.

The invention claimed is:

1. An inertial mass sensor, comprising:
 a. a collection filter that collects particulate matter from a fluid;
 b. a generally cylindrically shaped resonator, coupled to the collection filter, and having a length, a diameter and a longitudinal axis, and tapered to have a varying modulus of elasticity along its longitudinal axis;
  i. the resonator being configured for achieving reciprocating linear movement along its longitudinal axis located along the length of the cylinder;
  ii. having a first end and a second end; and
  iii. the collection filter being mounted to the first end of the resonator;
 c. a housing having an upper base and a lower base structure, surrounding the resonator, comprising:
  i. a cavity having a diameter greater than the diameter of the resonator;
 d. a first magnet, coupled to and surrounding the first end of the resonator;
 e. a drive coil that:
  i. surrounds the magnet; and
  ii. generates an alternating electric current to produce reciprocating linear movement of the magnet/resonator along the longitudinal axis of the resonator wherein the reciprocating linear movement has a resonant frequency that varies depending on the mass of the particulate matter in the collection filter;
 f. a means for sensing the resonance frequency of the resonator, located at the second end of the resonator; and
 g. a means for measuring the mass or resonant frequency of the particulate matter.

2. The inertial mass sensor of claim 1, further comprising:
 a. A (node) clamp that:
  i. is coupled to the resonator at a midpoint or the node point along its longitudinal axis;
  ii. is located between the upper base and lower base; and
  iii. is a location of zero amplitude of the resonator to create a half wave resonant structure.

3. The inertial mass sensor of claim 2, further comprising a flange coupled to the node clamp and to the base structure.

4. The inertial mass sensor of claim 1, further comprising a first magnetic core constructed of ferromagnetic material, iron, Permalloy, or other similar material located above and below each magnet.

5. The inertial mass sensor of claim 4, further comprising a second magnetic core, comprising ferromagnetic, iron, or Permalloy or other similar material located above and below each magnet.

6. The inertial mass sensor of claim 1, further comprising a second magnet, coupled to and surrounding the second end of the resonator.

7. The inertial mass sensor of claim 1, wherein the drive coil is replaced by a voice coil assembly.

8. The inertial mass sensor of claim 1, wherein the resonator is tapered.

9. The inertial mass sensor of claim 1, further comprising a means for determining/inferring the composition of the particulate matter based on its mass.

10. An inertial mass sensor, comprising:
    a. a collection filter that collects particulate matter from a fluid;
    b. a resonator, coupled to the collection filter, and having a length and a diameter:
        i. the resonator being configured for achieving reciprocating linear movement along its longitudinal axis located along the length of the cylinder;
        ii. having a first end and a second end; and
        iii. the collection filter being mounted to the first end of the resonator;
    c. A housing having an upper base and a lower base structure, surrounding the resonator, and having a cavity having a diameter greater than the diameter of the resonator;
    d. a first magnet, coupled to and surrounding the first end of the resonator;
    e. two drive coils that generate an alternating electric current to produce reciprocating linear movement of the magnet/resonator along the longitudinal axis of the resonator wherein the reciprocating linear movement has a resonant frequency that varies depending on the mass of the particulate matter in the collection filter; and
    f. a load cell for sensing the resonance frequency of the resonator, by monitoring the impulse force of the resonator and producing a static sign wave when the system is driven into resonance.

11. The inertial mass sensor of claim 10, wherein the static sign wave is used in a feedback loop to drive the system into and at resonance.

12. The inertial mass sensor of claim 10, wherein the load cell is located at the second end of the resonator.

13. The inertial mass sensor of claim 10, wherein the drive coil is replaced by a piezoelectric motor that generates surface acoustic waves along the resonator to induce resonance.

14. The inertial mass sensor of claim 13, wherein the piezoelectric motor is coupled to the virtual midpoint of the resonator assembly.

15. The inertial mass sensor of claim 13, further comprising a means to measure impedance produced by the piezoelectric motor during use to infer the resonant frequency.

16. The inertial mass sensor of claim 10, wherein the load cell:
    a. is coupled to a source of A/C current to cause reciprocating linear movement along the longitudinal axis of the resonator, and
    b. measures any phase difference between the electric current (drive) and resonance frequency.

* * * * *

UNITED STATES PATENT AND TRADEMARK OFFICE
CERTIFICATE OF CORRECTION

PATENT NO.        : 8,925,385 B2                                     Page 1 of 1
APPLICATION NO.   : 13/312861
DATED             : January 6, 2015
INVENTOR(S)       : David M. Korpi It is certified that error appears in the above-identified patent and that said Letters Patent is hereby corrected as shown below:

In the Specification:

Column 3, line 36, insert a --.-- at the end of the sentence;
Column 5, line 1, delete "Collection" and insert --collection--; and
Column 7, line 6, delete "EMI" and insert --EMF--.

Signed and Sealed this
Fourteenth Day of April, 2015

Michelle K. Lee
*Director of the United States Patent and Trademark Office*